(12) United States Patent
Martin et al.

(10) Patent No.: US 11,267,072 B2
(45) Date of Patent: Mar. 8, 2022

(54) METHOD FOR STRUCTURING A SUBSTRATE, ASSEMBLY COMPRISING A SUBSTRATE AND A DEVICE FOR STRUCTURING SAID SUBSTRATE, AND SUBSTRATE WITH SUCH A STRUCTURE

(71) Applicant: LASER ENGINEERING APPLICATIONS, Angleur (BE)

(72) Inventors: Paul-Etienne Martin, Bordeaux (FR); Anne Henrottin, Lierneux (BE); Sébastien Estival, Talence (FR); Axel Stefan M. Kupisiewicz, Neupré (BE); Jose Ramos De Campos, Angleur (BE)

(73) Assignee: LASER ENGINEERING APPLICATIONS, Angleur (BE)

( * ) Notice: Subject to any disclaimer, the term of this patent is extended or adjusted under 35 U.S.C. 154(b) by 126 days.

(21) Appl. No.: 16/624,116

(22) PCT Filed: Jun. 26, 2018

(86) PCT No.: PCT/EP2018/067126
§ 371 (c)(1),
(2) Date: Dec. 18, 2019

(87) PCT Pub. No.: WO2019/002301
PCT Pub. Date: Jan. 3, 2019

(65) Prior Publication Data
US 2020/0130099 A1    Apr. 30, 2020

(30) Foreign Application Priority Data

Jun. 27, 2017    (BE) .................................. 2017/5455

(51) Int. Cl.
*B23K 26/00*    (2014.01)
*B23K 26/064*    (2014.01)
(Continued)

(52) U.S. Cl.
CPC ........ *B23K 26/0006* (2013.01); *B23K 26/064* (2015.10); *B23K 26/082* (2015.10);
(Continued)

(58) Field of Classification Search
CPC .............. B23K 26/0006; B23K 26/064; B23K 26/082; B23K 26/10; B23K 26/702;
(Continued)

(56) References Cited

U.S. PATENT DOCUMENTS 2,758,502 A    8/1956   Scott et al.
6,501,045 B1   12/2002  Bernstein et al.
(Continued)

FOREIGN PATENT DOCUMENTS

| CN | 103 056 519 A | 4/2013 |
| WO | 2008/110613 A1 | 9/2008 |
| WO | 2017/029210 A1 | 2/2017 |

OTHER PUBLICATIONS

"Laser Assisted Joining of Plastic Metal Hybrids," Roesner et al., 2011 (Year: 2011).*
(Continued)

*Primary Examiner* — Daniel McNally
(74) *Attorney, Agent, or Firm* — Christensen O'Connor Johnson Kindness PLLC

(57) ABSTRACT

Method for structuring a substrate (11) and comprising the following steps: —providing a device (100) comprising a light source (33), an optical system (2) for obtaining an outgoing light beam (7) spatially offset in relation to the incoming light beam (1), and capable of modifying this spatial offset, focusing means (9) for focusing the outgoing light beam (7), a substrate holder (59), a movement device (60) for generating a movement (41) between the outgoing light beam (7) and the substrate (11); —providing and placing the substrate (11) on the substrate holder (59);
(Continued)

—etching the substrate with the focused outgoing light beam (7) having an angle of attack (107) greater than 1° for any spatial offset between outgoing light beam (7) and incoming light beam (1) imposed by the optical system (2).

15 Claims, 4 Drawing Sheets

(51) Int. Cl.
| | |
|---|---|
| *B23K 26/082* | (2014.01) |
| *B23K 26/70* | (2014.01) |
| *B23K 26/10* | (2006.01) |
| *B23K 26/20* | (2014.01) |
| *B23K 26/402* | (2014.01) |
| *B29C 65/16* | (2006.01) |
| *B29C 65/00* | (2006.01) |
| *G02B 19/00* | (2006.01) |
| *G02B 26/10* | (2006.01) |
| *B23K 103/00* | (2006.01) |

(52) U.S. Cl.
CPC .............. *B23K 26/10* (2013.01); *B23K 26/20* (2013.01); *B23K 26/402* (2013.01); *B23K 26/702* (2015.10); *B29C 65/1632* (2013.01); *B29C 66/028* (2013.01); *G02B 19/0009* (2013.01); *G02B 26/105* (2013.01); *B23K 2103/50* (2018.08); *B23K 2103/54* (2018.08); *G02B 19/0047* (2013.01)

(58) Field of Classification Search
CPC .. B23K 26/20; B23K 26/402; B29C 65/1632; B29C 66/028
See application file for complete search history.

(56) References Cited

U.S. PATENT DOCUMENTS

| | | | |
|---|---|---|---|
| 2014/0263212 A1* | 9/2014 | Zhang .................. | B23K 26/352 219/121.69 |
| 2016/0039045 A1* | 2/2016 | Webster ............... | G01N 21/954 356/496 |
| 2017/0157705 A1* | 6/2017 | Muenzer .............. | B23K 26/046 |

OTHER PUBLICATIONS

International Search Report dated Sep. 19, 2018, issued in corresponding International Application No. PCT/EP2018/067126, filed Jun. 26, 2018, 3 pages.

Written Opinion dated Sep. 19, 2018, issued in corresponding International ApplicationNo. PCT/EP2018/067126, filed Jun. 26, 2018, 6 pages.

Roesner, A., et al., "Laser Assisted Joining of Plastic Metal Hybrids," Physics Procedia 12:370-377, Jan. 2011.

International Preliminary Report on Patentability dated Dec. 31, 2019, issued in corresponding International Application No. PCT/EP2018/067126, filed Jun. 26, 2018, 7 pages.

* cited by examiner

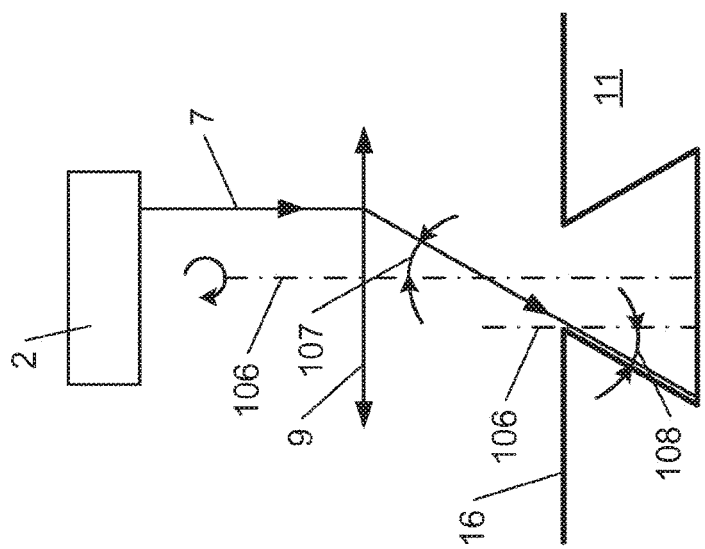
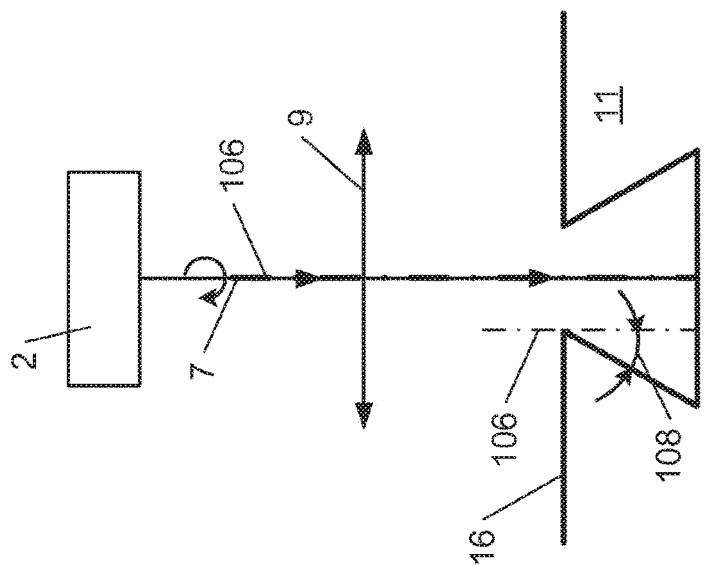
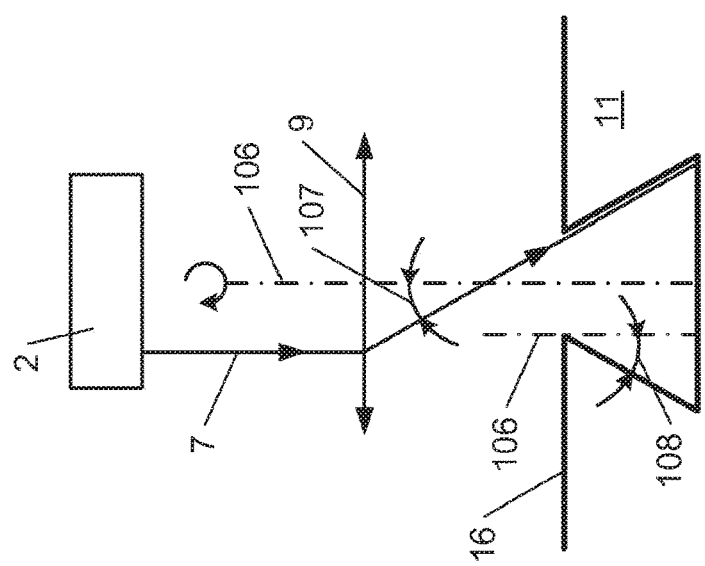

METHOD FOR STRUCTURING A SUBSTRATE, ASSEMBLY COMPRISING A SUBSTRATE AND A DEVICE FOR STRUCTURING SAID SUBSTRATE, AND SUBSTRATE WITH SUCH A STRUCTURE

TECHNICAL FIELD

According to a first aspect, the invention concerns a method of structuring a substrate. The invention also concerns a method of assembling two different materials, an assemblage comprising a device for structuring a substrate and said substrate, a system of assembling of two different materials, and a substrate structured according to the method of structuring of the first aspect of the invention.

BACKGROUND

It is known to structure a substrate in order to modify its surface properties and in particular in order to make an assembly with a second material. A modification of the contact surface consists, for example, in increasing the contact surface between a substrate and a second material. Increasing the contact surface requires, for example, a structuring of the surface of the substrate with mechanical, chemical and/or optical means.

Structuring the surface of a substrate in preparation for coming into contact with a second material is then used for improving the mechanical performances of the assembly.

A restriction of the increase in the contact surface between a substrate and a second material without the addition of intermediate material is to increase only the number of interatomic or intermolecular bonds. In the case of a substrate and a second material forming weak interatomic or intermolecular bonds, an increase of the contact surface between a substrate and a second material does not generally enable to obtain a good assembly.

SUMMARY OF THE INVENTION

According to a first aspect, one of the aims of the invention is to propose a method for structuring a surface of a substrate, the substrate can then be assembled by its structured surface to a second material, the assemblage having better mechanical properties of adhesion and in particular a better mechanical anchoring of the second material in the structures formed on the surface. For this purpose, the invention proposes according to a first aspect, a method for structuring a substrate having an upper surface and a lower surface, said method comprising the following steps:

a) providing a device comprising:
   a light source for generating a structuring incoming light beam capable of machining the upper surface of the substrate;
   an optical system for obtaining, from said incoming light beam, an outgoing light beam spatially offset in relation to said incoming light beam, said optical system being capable of modifying the spatial offset between said incoming light beam and said outgoing light beam;
   focusing means for focusing said outgoing light beam;
   a substrate holder;
   a movement device for generating a relative movement between said outgoing light beam and said substrate holder;

b) providing and placing said substrate on said substrate holder so as to have towards said focusing means its upper surface characterized by a normal;

c) generating with the light source the incoming light beam;

d) generating from the incoming light beam as it passes through the optical system, then through the focusing means, a focused outgoing light beam describing with the normal of the upper surface of the substrate at a focusing point of the outgoing light beam an angle of attack greater than 1°, preferably greater than 3°, for any spatial offset between outgoing light beam and incoming light beam imposed by said optical system;

e) initiating a relative movement between the substrate holder supporting the substrate and the focused outgoing light beam for etching a pattern from the upper surface of the substrate, the formed pattern comprising a cavity in the substrate opening through an opening at the upper surface of the substrate;

defining parameters of said light source according to said relative movement initiated in step e) for generating said incoming light beam such that the cavity of the formed pattern is non-through between said upper surface and said lower surface of said substrate.

The method according to the invention enables to create a pattern whose cavity or cavities have a negative conicity from the upper surface towards the inside of the substrate. Even if the term 'negative conicity' can be understood by a person skilled in the art, it is described later on, in particular during the discussion of Figures. Such profile of the structured pattern and more particularly of its cavity or cavities enables to obtain a 'structured substrate+second material' assemblage that has better adhesion by promoting in particular the mechanical anchoring of the second material in the cavity or cavities.

The method according to the invention enables to etch patterns that correspond to those recesses that have a negative conicity and that are non-through.

It is generally accepted that laser machining devices and for example the machining device described in the document WO 2017/029210 A1 are intended for drilling or cutting substrates with very straight edges. Such machining devices are used to drill or cut relatively small pieces, not exceeding dimensions higher than 10 mm or 20 mm. Such devices require a high accuracy of beam movement in relation to the substrate, a precision movement being preferably achieved by an optical system such as a scanner or galvanometric head. Such a machining device does not seem to be recommended for the production of non-through structures with negative conicity, because a drilling or cutting device is not intended for the production of surface structuring. The analogy with a drill or saw that does not enable to produce surface structuring in a well-controlled way seems particularly suitable for the present case. The inventors have nevertheless demonstrated that the use of an optical system enabling a controllable angle of attack of the light beam with the upper surface of the substrate enables the production of a surface structuring whose structuring patterns have a negative conicity. Such structuring being particularly well suited for the production of assemblies.

The method according to the invention enables to etch patterns that correspond to recesses having a negative conicity. The patterns thus created are preferably intended to make an assembly between the substrate comprising the recesses and another substrate, the assembly being essentially an anchoring assembly.

The method according to the invention enables to produce structuring efficiently by means of the movement device for moving the substrate which can be activated simultaneously with the outgoing light beam describing an angle greater than 3°, preferably greater than 5° in relation to a normal of the upper surface of the substrate, said normal being taken essentially near a focusing point of the outgoing light beam. It is generally accepted that for precision machining (drilling, cutting) an optical deflection means (scanner, galvanometric head) is particularly suitable for a fast machining on small surfaces. Larger machining surface being able to be eventually achieved by moving the substrate in order to produce several stitching meshes and cover a larger surface.

The simultaneous activation of the movement of the substrate and the light source enables in the context of this invention to produce a structuring on a large area without having to use an assembly of structured zones even if it would be possible to obtain a structuring with the device configurations proposed by the prior art. Thus the method according to the invention enables to produce the structuring of a substrate continuously.

The determination of the laser parameters depends on the speed of the relative movement mainly dictated by the speed of movement of the movement means, as well as on the power, the energy, the repetition frequency, the size of the outgoing beam . . . and finally on the thickness of the material and the nature of the material.

Preferably the movement device enables a relative movement of up to 100 mm, even more preferably up to 1.5 m. For example, the movement device enables a movement of up to 10 and even more preferably up to 40 m so that the surface of an essentially long element can be structured over its entire length in order to restrict the repetitions in the pattern due to too many stitching repetitions.

It is generally accepted that laser machining devices and for example the machining device described in the document WO 2017/029210 A1 is very efficient in cutting/drilling because it enables a precession movement with almost zero beam movement with a large modification of the beam incidence angle, this very important attribute for the cutting/drilling is not an attribute known by the person skilled in the art as being of interest for structuring. The inventors have nevertheless demonstrated that the use of an optical system according to the invention enables to obtain a good execution of the structuring with patterns having a negative conicity. Such structuring enables the production of assemblies having a high tensile, shear and peel strength.

The inventors also found that the optical system implemented by the method according to the invention enables to obtain finer groove dimensions in relation to other prior art optical systems. Indeed the system used for the invention enables to have a convergence point of the beams closer to the surface or on the surface of the substrate.

Preferably, the device used by the method according to the invention enables to produce through and/or non-through holes (or cavities). Preferably, the light source generates a pulsed structuring incoming light beam. Preferably, the pulses of the structuring incoming light beam have a duration of less than 1000 ns, more preferably between $10^{-15}$ s and $10^{-6}$ s, even more preferably between $10^{-14}$ s and $10^{-8}$ s. For example, the structuring incoming light beam is able to etch holes and grooves, through or not-through. Preferably the upper surface is essentially flat. Preferably, the focused outgoing light beam is able to etch the upper surface of the substrate.

In the case of a structuring or machining method with ultra-short pulses and an outgoing light beam arriving on the surface of the substrate with an angle of the focused outgoing light beam and a normal of the upper surface of the substrate equal to zero, then the structuring or machining performed necessarily has an incoming diameter larger than the diameter located deeper in the thickness of the substrate. This characteristic of structuring or machining shape is inherent to the structuring or machining method with ultra-short pulses and a zero outgoing light beam angle with the surface of the substrate as well as the intensity profile of the laser beam used. The advantage of the device used by the method according to the invention for structuring a substrate in relation to a method of structuring or machining with ultra-short pulses and an outgoing light beam angle with the surface of the substrate equal to zero is to enable the outgoing light beam to reach the surface of the substrate at a controlled angle between the focused outgoing light beam and a normal of the upper surface of the substrate in order to form surface structures of the substrate preferably with a negative conicity and thus to promote the anchoring of a second material thereinto.

The device used by the method according to the invention enables in particular to machine materials by controlling the structuring angle or etching angle in order to obtain controlled etching angles according to the material and the laser used for example. The device used by the method according to the invention enables for example to obtain etching faces perpendicular to the surface of the machined substrate. This device enables to obtain etching faces with a selected angle in relation to the surface of the substrate. An etching or structuring face is the face formed during the machining for etching a substrate. Preferably, the angle of the etching or structuring has a negative conicity when the structuring or machining enables to remove the material below the surface by which the piece is machined and not only at the vertical of the area by which the piece is machined or structured.

Preferably, the angle of attack greater than 1° and more preferably greater than 3°, is true for any spatial offset of the outgoing light beam in relation to the incoming light beam imposed by the optical system.

The lasers are preferably defined by a Gaussian type beam. A Gaussian beam is particularly suitable for machining materials. A Gaussian beam in a homogeneous environment is a light beam that has a Gaussian distribution of intensity perpendicular to its direction of propagation. In the case of a Gaussian laser beam, the intensity of the beam is greater at the centre of the laser beam than at its edges.

During the passing of a laser beam having a Gaussian intensity profile through focusing means, for example a focusing lens or a telecentric lens, the laser beam is preferably focused at a focal spot or focusing spot, i.e. an area where the density of the laser beam is most important. A focusing spot is preferably designated by a focusing point.

The method according to the invention enables to obtain a structured substrate with a negative conicity for producing an assembly with a second material, the assembly thus obtained having better mechanical properties than with an unstructured substrate. Structuring the substrate with a negative conicity enables to improve the mechanical properties of the assembly, preferably in tension, tearing, shearing and peeling.

The advantage of the method according to the invention is that it can machine or structure large surfaces, of the order of several $mm^2$ to several tens of $cm^2$, with a structuring width of for example 100 μm with a repetition every 200 μm. By controlling the angle of attack and/or the positioning of the substrate in relation to the focused outgoing light beam, the assemblage according to the invention enables to structure the surface, a hole, an etching or a cutting of the substrate with a controlled conicity: positive, zero or with a negative conicity.

Preferably, the relative movement between said substrate and said outgoing light beam is a relative movement according to a plan parallel to the upper surface, so that the focused outgoing light beam can etch a pattern from the upper surface on an essentially flat surface having an area greater than 1 cm$^2$, preferably greater than 10 cm$^2$ and even more preferably greater than 100 cm$^2$. For example 50 mm×10 mm, preferably 50 mm×50 mm, more preferably 100 mm×100 mm. For example 100 mm×1500 mm, 20 mm×2000 mm, 20×5000 mm, 50 mm×10 mm, preferably 50 mm×50 mm, more preferably 100 mm×100 mm.

Preferably, the substrate comprises a lower surface essentially separated from said upper surface by a thickness of said substrate, said cavity is non-through between said upper surface and said lower surface of said substrate and non-opening at said lower surface.

Preferably, the movement device is activated for generating a movement between said substrate and said outgoing light beam simultaneously with said light source.

Preferably, the spatial offset between the incoming light beam and the outgoing light beam imposed by the optical system is a fixed spatial offset in relation to the focusing means so as to etch a pattern having a cavity comprising:
at its opening on said upper surface of said substrate, a first and a second ends defined in a plan essentially perpendicular to said upper surface of the substrate,
an opening width defined by a distance between said first and second ends of said opening,
a cavity width defined essentially parallel to said opening width which is essentially decreasing from the upper surface along the thickness of the substrate.

Preferably, the cavity comprises:
at its opening on the upper surface of the substrate, a first and a second ends defined in a plan essentially perpendicular to the upper surface of the substrate,
an opening width defined by a distance between the first and second ends of the opening,
the opening width being strictly less than a maximum width of cavity, defined essentially parallel to the opening width in the thickness of the substrate.

Preferably, the extension of the opening measured essentially perpendicular to the thickness increases as one moves away from the upper surface towards the inside of the substrate.

Preferably, the cavity is characterized by a negative conicity angle comprised between 0° and 7°, more preferably between 0.01° and 5°, the negative conicity angle being defined between the normal to the upper surface of the substrate and a straight line passing through the first end of the opening width.

Preferably, the upper surface of the substrate is etched in a non-through way.

According to a preferred embodiment, the optical system comprises:
a mirror:
having an essentially flat reflection surface defined by a normal for obtaining a first reflected light beam from a first incident light beam from said incoming light beam,
movable
drive means for moving said movable mirror;
a redirection system:
positioned in relation to the mirror for obtaining from the first reflected light beam, a second incident beam to said mirror, for obtaining the outgoing light beam from a reflection of the second incident light beam on the movable mirror.

For example one advantage of this embodiment of the device used in the method according to the invention is to enable the machining or structuring according to one or two dimensions in order to obtain a structuring according to a line, for example to etch a structuring describing a particular angle with the surface of the substrate. Another advantage of this embodiment of the device used in the method according to the invention is to be able to take into account or correct the non-homogeneity of the intensity profile of the laser beam used.

For example cavities having a cavity width defined essentially parallel to the opening width which is essentially decreasing from the upper surface along the thickness of the substrate are obtained by the offset of the outgoing light beam upstream from the focusing means according to a single axis or according to two axes. For example, these cavities can be obtained with a fixed mirror and a deflection system enabling to offset the outgoing light beam upstream from the focusing means according to one or two axes. These cavities or grooves being obtained with an angle of attack of the fixed focused laser beam in relation to the normal to the substrate. In this embodiment of the invention, an orientation of the mirror enables to change the orientation of the groove. In this embodiment, the grooves can be formed with a precession of the outgoing light beam in relation to the surface of the substrate or without precession.

Preferably, a deflection system enables to direct an outgoing light beam according to an area of dimension 2×3 cm, for example according to an area of dimension 15×20 cm, the dimension of the area that can be covered by a deflection system is mainly dependent on the focal length of the objective lens and more generally on the configuration of the optical device. For large areas covered by the deflection system, aberrations at the shape of the patterns can be observed. However, for assembling applications, such aberrations do not lead to a decrease in the quality of the observed assembly.

The optical system used for the invention enables to adjust the angle of attack of the beam while being compatible with a deflection system. This is particularly advantageous for producing the structuring because it enables to cover a field of 20 to 30 mm only with the deflection system, the prior art devices not enabling to cover a field of 1 to 2 mm.

Preferably the optical system in combination with a deflection system comprises focusing means with a long focal length for covering a larger field of up to 100 mm or 150 mm in a direction of attack. This enables a structuring to be carried out according to a dimension of 100 mm by 100 mm without having to use of the movement device.

According to another preferred embodiment the optical system comprises:
a mirror:
having an essentially flat reflection surface defined by a normal for obtaining a first reflected light beam from a first incident light beam from the incoming light beam,
movable such that its normal is capable of describing a trajectory in a three-dimensional space;
the optical system being configured so that the first incident light beam and the normal of the mirror are separated by an angle of between 0° and 15° for all possible positions and orientations of the movable mirror, preferably between 0.01° and 10° and even more preferably between 3° and 8°;

drive means for moving the movable mirror;

a retro-reflection system:
  positioned in relation to the mirror for obtaining from the first reflected light beam, a second incident light beam to the mirror for all positions and orientations of the mirror, for obtaining the outgoing light beam from a reflection of the second incident light beam on the movable mirror, and
  capable of providing the second incident light beam on the mirror, parallel to the first reflected light beam for all possible positions and orientations of the movable mirror.

Preferably, the optical system is configured so that the first incident light beam and the normal of the mirror are separated by an angle of between 0.01° and 10°, for all possible positions and orientations of the movable mirror, preferably between 0.1° and 8° and even more preferably between 3° and 8°.

Preferably, the movable mirror is configured for describing a 360° rotation about an axis of rotation intersecting the normal of the movable mirror, and in that the driving means are configured to enable the movable mirror to rotate about the axis of rotation.

Preferably, the retro-reflection system is movable in translation in relation to the mirror.

Preferably, the optical system is configured for obtaining upstream of the focusing means and for all possible positions and orientations of the movable mirror, an outgoing light beam capable of describing in a perpendicular plan to its main direction of propagation a circle having a diameter of less than 30 mm or an ellipse whose largest axis is less than 30 mm, more preferably less than 25 mm and even more preferably less than 20 mm, or an ellipse whose largest axis is less than 30 mm, more preferably less than 25 mm and even more preferably less than 20 mm.

The largest axis of the ellipse can also be called the longest diameter of the ellipse or the largest diameter.

Preferably, a change in the distance between the retro-reflection system and the mirror is capable of inducing a modification in said diameter or said largest axis.

Preferably, the variation in diameter or largest axis is capable of inducing a variation in the angle between the outgoing light beam downstream of the focusing means and a normal of the upper surface of the substrate.

Preferably, the device also comprises a deflection system positioned between the optical system and the focusing means to offset the outgoing light beam. For example, a deflection system is a scanner, for example a galvanometric scanner. Preferably, the deflection system is positioned upstream of the focusing means.

Preferably, the focusing means comprise a telecentric lens.

The advantage of using a telecentric lens for focusing the outgoing light beam is to enable a structuring or a machining with a constant angle of attack of the focused outgoing light beam for variations in the orientation of the outgoing light beam upstream of the telecentric lens. Preferably a telecentric lens is used with a deflection system to enable a modification in the position of the outgoing light beam without modifying its angle of attack.

Preferably, the focusing means are designed for focusing the outgoing light beam on the upper surface of the substrate.

Preferably, the focusing means are designed for focusing the outgoing light beam in a focusing plan for all possible positions and orientations of the movable mirror.

Preferably, the device further comprises a beam collimator positioned between the light source and the optical system, configured for being traversed by the incoming light beam and for modifying the convergence of the incoming light beam, so that the distance between the focusing means and the focusing point of the outgoing light beam is capable of being modified.

Preferably, the optical system is configured so that a projection of the outgoing light beam, in a focusing plan and for all possible positions and orientations of the movable mirror, has an essentially circular outer contour.

For example, the integration of the outgoing light beam downstream of the focusing means during its precession describes the shape of a cone with an angle of attack in relation to the surface of the substrate to be structured, machined or etched. For example, the precession of the outgoing light beam describes an essentially circular movement on the substrate to be structured, machined or etched.

Preferably, the angle of attack is between 1° and 15°, preferably between 2° and 5°, more preferably between 3° and 4°, for any spatial offset between the outgoing light beam and the incoming light beam imposed by said optical system.

Preferably, the optical system is capable of inducing a precession movement of the focused outgoing light beam in relation to the upper surface of said substrate.

Preferably, the driving means of the movable mirror are capable of imposing a rotation speed of the mirror comprised between 1,000 and 200,000 rpm, more preferably between 5,000 and 100,000 rpm and even more preferably between 10,000 and 50,000 rpm and the relative movement speed of the substrate in relation to the focused outgoing light beam is comprised between 500 mm/s and 0.1 mm/s, more preferably between 200 mm/s and 0.5 mm/s and even more preferably between 100 mm/s and 1 mm/s.

For example, the diameter of the focused beam at the focusing point is less than or equal to the opening width of the cavity.

According to a second aspect, the invention proposes a method of assembling a substrate with a piece and comprising the following steps:
  structuring an upper surface of the substrate using a method according to the first aspect of the invention, for generating a first part of structured upper surface of the substrate comprising a pattern;
  providing the piece which have a surface with a second surface part comprising a fusible material having a melting point lower than the melting point of the first part of structured upper surface of the substrate;
  placing the first part of structured upper surface of the substrate in contact with the second part of surface of the piece;
  applying a pressure to maintain contact between the first part of structured upper surface of the substrate and the second part of surface of the piece;
  providing a heater for creating a temperature increase in the fusible material sufficient to melt it; and
  heating, by means of the heater, the fusible material so as to reach a temperature in the fusible material sufficient to melt at least a part of it in the pattern of the first part of structured upper surface of the substrate;

The different variants and advantages described for the method according to the first aspect of the invention apply to the method of assembling according to the second aspect, mutatis mutandis.

Preferably, the heater is a laser capable of producing a laser beam capable of heating by irradiation the first part of structured upper surface of the substrate and the piece is at least partially transparent to the beam. For example, the heater is a welding laser. A better assembly will be obtained by adapting the length of the laser beam with a maximum of the absorption spectrum of the material to be heated. Preferably, the piece comprises of a polymer or glass. Preferably, the fusible material of the piece penetrates into the pattern of the first part of structured upper surface of the substrate through the upper surface of the substrate.

Preferably, the fusible material of the piece comprises monomers and/or polymer chains, more preferably a thermoplastic polymer and even more preferably an elastomeric thermoplastic polymer. Preferably, the fusible material has at least one transition temperature and preferably, this at least one transition temperature is a glass transition temperature. For example, the fusible material is heated above its glass transition temperature. Preferably, said at least one transition temperature is a melting temperature. For example, the fusible material is heated above its melting temperature.

According to a third aspect, one of the purposes of the invention is to provide an assemblage comprising a substrate and a device for structuring said substrate which can subsequently be assembled with a second material and whose assembly with this second material has a higher adhesive force or mechanical strength. A better mechanical strength is achieved by the angle described by the negative conicity structures formed and the surface of the substrate. The negative conicity structures formed on the surface of the substrate enables a better adhesion of the second material to the substrate by promoting in particular the mechanical anchoring of the second material in negative conicity structures. For this purpose, the invention proposes, according to this third aspect, an assemblage comprising a substrate having an upper surface and a lower surface and a device for structuring said substrate, said device comprising:
- a light source for generating a structuring incoming light beam capable of machining the upper surface of the substrate;
- an optical system for obtaining, from said incoming light beam, an outgoing light beam spatially offset in relation to the incoming light beam, the optical system being capable of modifying the spatial offset between the incoming light beam and the outgoing light beam;
- focusing means for focusing the outgoing light beam;
- a substrate holder;
- a movement device for generating a relative movement between the outgoing light beam and the substrate holder;
- the substrate being placed on the substrate holder so as to have towards the focusing means its upper surface characterized by a normal,
- the device being configured so that the focused outgoing light beam and the normal of the upper surface of the substrate at a focusing point of the outgoing light beam are separated by an angle of attack greater than 1°, preferably greater than 3°, for any spatial offset between the outgoing light beam and the incoming light beam imposed by the optical system.
- parameters of said light source (33) are defined according to said relative movement for generating said incoming light beam such that the cavity (3) of the formed pattern (17) is non-through between said upper surface (16) and said lower surface of said substrate (11).

The different variants and advantages described for the methods according to the first and second aspects of the invention apply to the assemblage according to the third aspect, mutatis mutandis.

Preferably, the substrate comprises a lower surface essentially opposite to said upper surface, said cavity is non-opening at said lower surface.

Preferably, the movement device is capable of generating the relative movement between the substrate and the outgoing light beam in an area greater than 1 $cm^2$, preferably greater than 10 $cm^2$ and even more preferably greater than 100 $cm^2$, said relative movement being generated in a plan parallel to the upper surface, so that the focused outgoing light beam can etch a pattern from the upper surface. For example 50 mm×10 mm, preferably 50 mm×50 mm, more preferably 100 mm×100 mm. For example 100 mm×1500 mm, 20 mm×2000 mm, 20×5000 mm, 50 mm×10 mm, preferably 50 mm×50 mm, more preferably 100 mm×100 mm.

Preferably, the device is configured so that said focused outgoing light beam and a normal of said upper surface of said substrate at a focusing point of said outgoing light beam are separated by an angle of attack comprised between 1° and 15°, preferably between 2° and 5°, and even more preferably between 3° and 4°, for any spatial offset between the outgoing light beam and the incoming light beam imposed by said optical system.

The advantage of the device comprised in the invention is that it enables the focusing of a laser beam with a controlled angle of attack in two dimensions. The device of the invention also enables the machining or the structuring according to a dimension for a structuring according to a line and also enables the formation of circular holes or more complex patterns with an angle of attack of the constant outgoing light beam.

The advantage of the device comprised in the invention and more particularly of the optical system is that it is relatively light and space-saving. In addition the side offset upstream of the focusing means and thus the angle of attack on the substrate can be easily controlled by the relative positioning of the mirror with the retro-reflection system.

A laser beam for structuring or machining is preferably considered to have a Gaussian intensity profile. A focused laser beam in a plan means that for several positions of the laser beam, the focusing spot is comprised in said plan. Preferably, a spot of focusing a focused laser beam comprises a depth of field. For several laser beam positions in a plan, the focusing spot is comprised in said plan, i. e. a position of the focusing spot located in the depth of field of the focusing spot is comprised in said plan.

Preferably, the focusing plan is parallel to the upper surface of the substrate. Preferably, the focusing plan is coincident with the upper surface of the substrate. Preferably, the focusing means comprise an optical axis. Preferably, the focusing means are a converging lens.

Preferably, the spatial offset between the incoming light beam and the outgoing light beam imposed by the optical system is a fixed spatial offset in relation to the focusing means so that a relative movement generated by the movement devices enables the etching of a pattern such that said cavity comprises:
- at its opening on said upper surface of said substrate, a first and a second ends defined in a plan essentially perpendicular to said upper surface of the substrate, an opening width defined by a distance between said first and second ends of said opening, a cavity width defined essentially parallel to said opening width which is essentially decreasing from the upper surface along the thickness of the substrate.

Preferably, the movement device enables to generate a linear movement at a speed up to 100 mm/s, more preferably at a speed up to 50 mm/s and even more preferably at a speed up to 25 mm/s.

According to a fourth aspect, the invention proposes a system for assembling a substrate with a piece comprising a fusible material having a melting point lower than the melting point of the substrate, the system comprising:

an assemblage according to the third aspect of the invention for structuring an upper surface of the substrate;

means for contacting the piece with the upper surface of the substrate;

a means of compression;

a heater capable of creating a sufficient temperature increase in the fusible material for melting at least a part of it.

The different variants and advantages described for the methods according to the first and second aspects of the invention and for the assemblage according to the third aspect of the invention apply to the system according to the fourth aspect, mutatis mutandis.

According to a fifth aspect, the invention proposes a substrate having a structuring of its upper surface with a negative conicity obtained according to the method of structuring of the first aspect of the invention.

The different variants and advantages described for the methods according to the first and second aspects of the invention and for the assemblage and the system according to the third and fourth aspect of the invention apply to the substrate according to the fifth aspect, mutatis mutandis.

According to a sixth aspect, the invention proposes a waveguide formed in the substrate according to the fifth aspect of the invention, the negative conicity structuring comprising a second material, said second material having a refractive index higher than the refractive index of said substrate, said second material being a polymer material and more preferably of poly(methyl methacrylate).

The different variants and advantages described for the methods according to the first and second aspects of the invention and for the assemblage and the system according to the third and fourth aspects of the invention as well as for the substrate according to the fifth aspect apply to the waveguide according to the sixth aspect, mutatis mutandis.

According to a seventh aspect, the invention proposes an electrical circuit comprising a substrate according to the fifth aspect of the invention, the negative conicity structuring comprises a conductive material and the substrate comprises an electrically insulating material. Preferably, the conductive material has a higher optical absorption coefficient than the substrate in a wavelength range between 200 nm and 12000 nm. Preferably, the substrate is a flexible substrate. Preferably, the conductive material comprises tin.

The different variants and advantages described for the methods according to the first and second aspects of the invention and for the assemblage and the system according to the third and fourth aspects of the invention as well as for the substrate according to the fifth aspect apply to the electrical circuit according to the seventh aspect, mutatis mutandis.

Using of the assemblage according to the third aspect for the structuring of the upper surface of a substrate such that the device enables to etch a pattern having a cavity comprising:

at its opening on said upper surface of said substrate, a first and a second ends defined in a plan essentially perpendicular to said upper surface of the substrate, an opening width defined by a distance between said first and second ends of said opening, said opening width being strictly less than a maximum width of cavity, defined essentially parallel to said opening width in the thickness of the substrate.

the parameters of said light source of said device being defined, according to said relative movement, for generating said incoming light beam such that the cavity of the formed pattern is non-through of said substrate.

BRIEF DESCRIPTION OF THE FIGURES

Other characteristics and advantages of the invention will become apparent from reading the following detailed description for the understanding of which reference is made to the accompanying figures in which:

FIG. 3a, 3b, 3c illustrate the steps enabling the structuring of a substrate with a negative conicity according to the first aspect of the invention.

EXAMPLES OF EMBODIMENTS OF THE INVENTION

Figure 1:
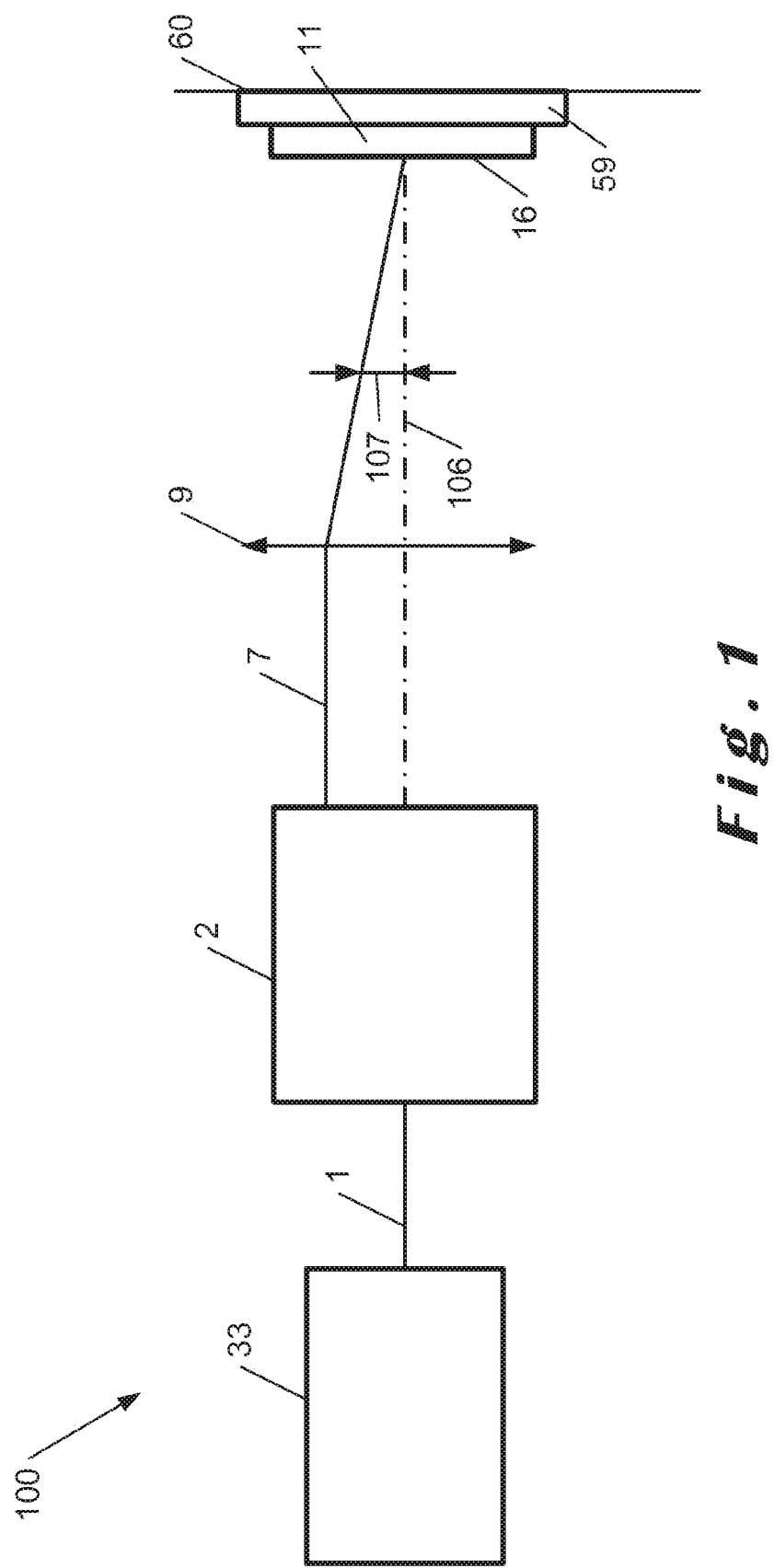
FIG. 1 illustrates an embodiment of a device for structuring a substrate according to the invention.

This invention is described with particular embodiments and references to the figures, but the invention is not restricted by them. The drawings or figures described are only schematic and are not restricting. In the context of the present document, the terms "first" and "second" are only used to differentiate the different elements and do not imply an order between them. In the figures, identical or similar elements may have the same references.

The structuring method according to the first aspect of the invention enables to structure and/or machine a surface of a substrate 11 with a light beam 7 having an angle of attack 107 in relation to a normal 106 to the surface of the substrate 11 preferably greater than 1°. Different optical systems 2 could be used for different embodiments to vary the angle of attack 107 of the light beam 7 in relation to a normal 106 to the upper surface 16 of the substrate 11. For example, one or more embodiments enable to obtain an outgoing light beam 7 offset in relation to the outgoing light beam 1 with an optical system 2 using a movable mirror 19. For example, a movable mirror 19 with a normal 26 is capable to describe a trajectory in a two-dimensional or three-dimensional space. For example, an embodiment of the invention enables, by means of the movement device 60, to impose on the substrate 11, an angle of attack 107 by the movement of the substrate in relation to the focused outgoing light beam 7. For example, another embodiment enables to impose an angle of attack 107 greater than 1° by an offset of the outgoing light beam 7 in relation to the incoming light beam 1 by means of the optical system 2 and by moving the substrate 11 by the movement system 60 in relation to the outgoing light beam 7.

FIG. 1 shows a diagram of a possible embodiment of the structuring device 100 of the invention. The structuring device 100 comprises a light source 33 which is preferably a laser source and even more preferably a pulsed laser source which produces an incoming light beam 1. The structuring device 100 comprises an optical system 2 which enables to obtain from the incoming light beam 1 an outgoing light beam 7 which has is spatially offset in relation to the said incoming light beam 1. As shown in FIG. 1, the outgoing light beam is focused on a substrate 11 by passing through a focusing means 9, a converging lens for example. A converging lens is for example a symmetrical biconvex, asymmetrical biconvex, plan-convex or converging meniscus type. A converging lens is preferably spherical. The device 100 also comprises movement means 60 for moving the substrate 11. The substrate 11 is positioned on a movement device 60 enabling the substrate 11 to be positioned relatively in relation to the outgoing light beam 7. The optical system 2 enables the outgoing light beam 7 to be rotated before passing through the focusing means 9. Thus the outgoing light beam 7 before passing through the focusing means 9 is always parallel to itself regardless of its position during its rotational movement. Indeed, the optical system enables the side offset of the outgoing light beam 7 such that it is always parallel to itself. Considering a plan at the entrance of the outgoing light beam 7 perpendicular to the outgoing light beam 7, the projection of the outgoing light beam 7 on this plan during its rotational movement preferably describes a circle. The outgoing light beam 7 describes a precession movement after passing through the focusing means 9. The outgoing light beam 7 is focused at a point, at a spot or small surface on the substrate 11 to be machined or structured.

In FIG. 1, the rotational movement imposed by the optical system 2 on the outgoing light beam 7 is produced about an axis 106, preferably called the precession axis. The axis around which the precession movement of the outgoing light beam 7 is produced is preferably aligned with the optical axis 106 of the focusing means 9. Thus the outgoing light beam 7 is focused at a point, at a spot or a small surface centred on the optical axis 106 of the focusing means 9. The focusing of the outgoing light beam 7 by the focusing means 9 is done at a point, a spot or a small focusing surface located at a distance on the optical axis 106 of the focusing means 9 consisting of a converging lens corresponding to the image focus of the converging lens. For example for making a structuring of the upper surface 16 of a substrate 11, the converging lens is positioned so that its image focus is at the upper surface 16 of the substrate 11. Depending on the depth of the desired structuring or machining, the image focus of the converging lens (of the focusing means) can be moved further below the upper surface 16 of the substrate 11. For example, in the case of structuring through the substrate 11 or etching, the image focus of the focusing means 9 is moved into the depth of the substrate 11. The correct positioning of the image focus of the focusing means 9 enables to obtain a structuring or an etching with very straight and sharp edges, i.e. without recast parts for example.

For example a converging lens comprised in a focusing means 9 has a focal length between 10 mm and 160 mm, more preferably between 20 mm and 100 mm. For example the converging lens can be exchanged so that it is a focal length of 80 mm, 50 mm or 30 mm. For example, a telecentric lens comprised in the focusing means 9 has a focal length between 10 mm and 160 mm, more preferably between 20 mm and 100 mm. For example the telecentric lens is used when a deflection means is positioned between the optical system 2 and the focusing means 9.

For a focal length of the converging lens of the given focusing means 9, the amplitude of the side offset of the outgoing light beam 7 before passing through the focusing means 9 enables to modify the angle of attack 107 of the outgoing light beam 7 with a normal 106 of the upper surface 16 of the substrate 11. Under these conditions, an increase in the amplitude of the side offset results in a higher value of angle of attack 107. The angle of attack 107 has preferably an angle of attack 107 comprised between 3° and 10°. Depending on the desired angle of attack and the precision of the desired structuring or machining, the focal length of the converging lens can be adjusted. A converging lens with a focal length of 80 mm enables, for example, a maximum angle of attack 107 of about 5° and enables the realization for a position of the substrate 11 a structuring or a hole with a maximum size of 1000 µm and a minimum size of 90 µm. A converging lens with a focal length of 50 mm enables, for example, a maximum angle of attack 107 of about 7° and enables the realization for a position of the substrate 11 a structuring or a hole with a maximum size of 500 µm and a minimum size of 60 µm. A converging lens with a focal length of 30 mm enables, for example, a maximum angle of attack 107 of about 10° and enables the realization for a position of the substrate 11 a structuring or a hole with a maximum size of 200 µm and a minimum size of 40 µm. The selection of the focusing means and in the case of a converging lens, of its focal length enables to modify the angle of attack 107 of the outgoing light beam 7 with a normal 106 coming from the upper surface 16 of the substrate 11.

The movement means 60 are for example numerically-controlled movement means controlled by computer. The movement means 60 enables, for example, to make translations according to 5 axes. In the configuration of an optical system 2 with a mirror 19 movable in rotation, it is possible to define a continuous rotation of the mirror with an angular position of the mirror independent of the position of the substrate to be machined or structured. It is also possible to impose an angular position of the mirror 19 according to the position of the substrate to be machined or structured in order to be able to machine or structure the substrate 11 with an incidence angle 107 for a certain position of the substrate 11. A substrate holder 59 is positioned on the movement means 60. The substrate holder 59 enables a good holding of the substrate in relation to the movement means 60. The substrate holder 59 enables a good transmission of the translation movements induced by the movement means 60 to the substrate 11.

The light source 33 is preferably a monochromatic laser light source capable of wavelengths of 258 nm, 266 nm, 343 nm, 355 nm, 515 nm, 532 nm, 1030 nm and 1064 nm. The device 100 according to the invention enables the use of the above-mentioned wavelengths without being restricted to other wavelengths in the range 250 nm to 1100 nm.

Figure 2:
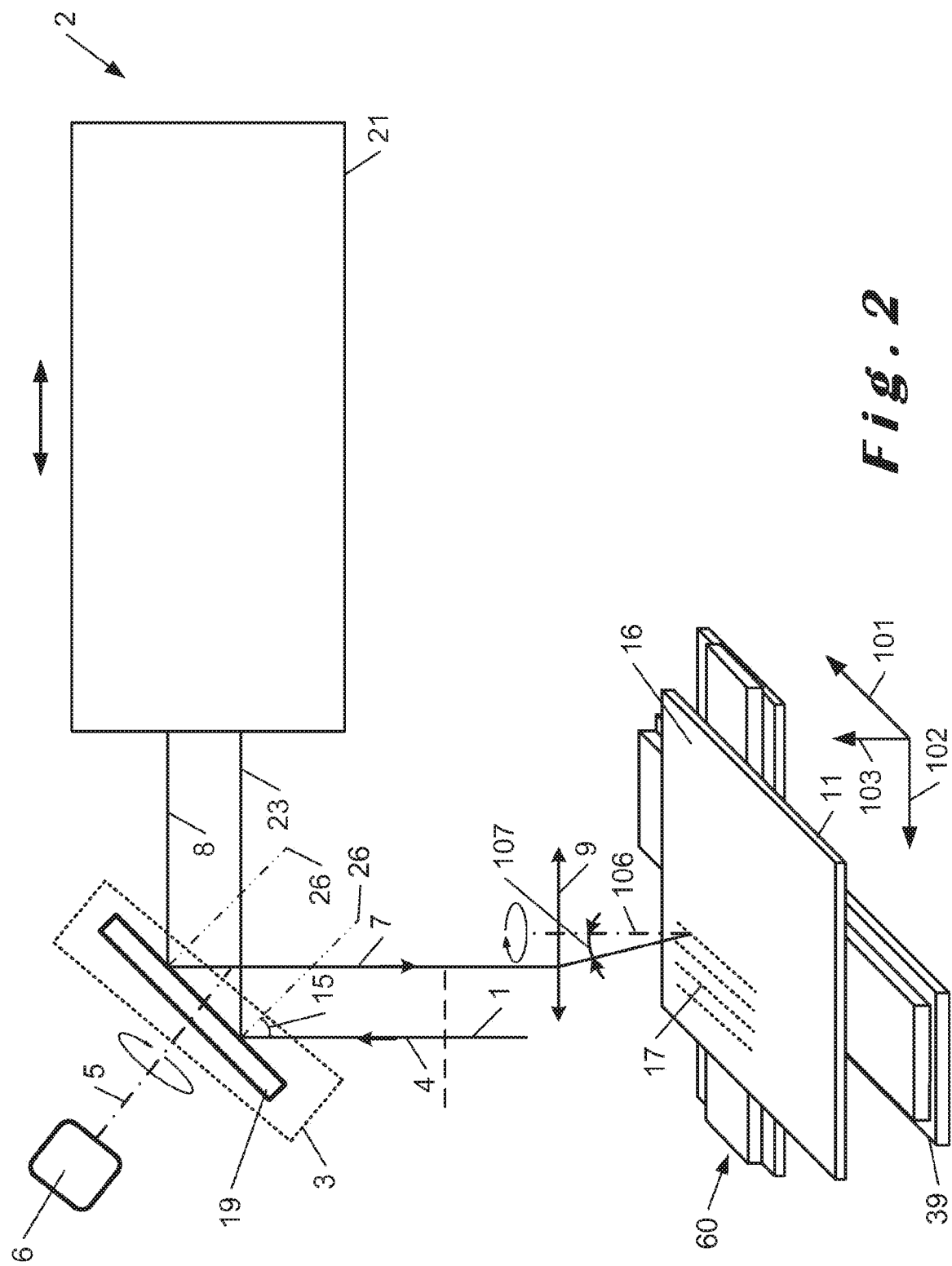
FIG. 2 illustrates an embodiment of an optical system comprised in a device for structuring a substrate according to the invention.

FIG. 2 shows an example of embodiment of the device 100 and in particular the optical system 2 and the movement device 60. In the embodiment of the optical system shown in FIG. 2, the incoming light beam 1 is a light beam generated by the light source 33 and preferably travelling outside the optical system 2 before entering it, while the incident light beam 4 travels only inside the optical system 2. The incident light beam 4 can be obtained by deflecting the incoming light beam 1 or without deflecting the incoming light beam 1. In the embodiment of FIG. 2, the incoming light beam 1 and the incident light beam 4 are on the same linear trajectory. The optical system 2 comprises a mirror 19 which enables to obtain a first light beam reflected 23 by the reflection of the incident light beam 4. The optical system 2 also comprises a retro-reflection system 21 which enables to redirect the first reflected light beam 23 on the mirror 19. In other words, the second incident light beam 8 towards the mirror 19 is obtained by the passing of the first reflected light beam 23 through the retro-reflection system 21. The second incident light beam 8 is then reflected by the mirror 19 and forms an outgoing light beam 7. The optical system 2 is configured so that the outgoing light beam 7 can be spatially offset in relation to the incoming light beam 1 while remaining parallel to the direction of the incoming light beam 1 upstream of the focusing means 9. In the example shown in FIG. 2, the incoming light beam 1 and the outgoing light beam 7 are offset transversely. In FIG. 2, the mirror 19 can rotate completely around a rotation axis 5 and drive means 6 enable the mirror 19 to rotate around its rotation axis 5. The optical system 2 of the device 100 is configured so that the first incident light beam 4 and the normal 26 to the mirror 19 are separated by an angle 15 between 0° and 15° for all possible positions and orientations of the movable mirror 19. This angle 15 is not shown to scale in FIG. 2 for reasons of clarity of the figure. The optical system 2 is configured so that a change of position between the mirror 19 and the retro-reflective system 21 enables to induce a variation in the offset between the incoming 1 and outgoing 7 light beams. The optical system for example is mounted on a movement plate. In the embodiment shown in FIG. 2, depending on the angular position of the movable mirror 19, the outgoing light beam 7 will follow a different trajectory. Preferably each of the trajectories of the outgoing light beam 7 obtained for each of the angular positions of the movable mirror 19 are parallel. The optical system 2 also comprises one or more focusing means 9 to focus the outgoing light beam 7 on the substrate 11. The rotational movement of the outgoing light beam 7 generated by the rotation of the mirror 19 upstream of the focusing means 9, enables to produce the precession movement of the outgoing light beam 7 downstream of the focusing means 9. The precession movement of the outgoing light beam 7 is preferably produced at a point, a spot or a small surface on a substrate 11 intended to be structured or machined. The precession movement is illustrated in FIGS. 2, 3a, 3b and 3c by arrows describing a portion of a circle. Finally, the device comprises movement means 60 enabling to move the substrate 11 relatively in relation to the outgoing light beam 7. The movement means 60 enables for example to move the substrate according to the directions 101, 102 and 103. The directions 101, 102 and 103 preferably defining a three-dimensional Cartesian coordinate system.

In addition to the drive means 6 enabling the rotation of the movable mirror 19, means for imposing a translation movement of the movable mirror 19 and or means for modifying the inclination of the movable mirror 19 may be present (mirror 19 tiltable in two or more non-parallel directions and drive means capable of modifying the inclination of the mirror 19, these drive means being for example a piezoelectric system). The point of combining a translational movement and a rotational movement of the mirror 19 is to generate by the relative rotational movement between the mirror 19 and the retro-reflection system 21, a precession of the outgoing light beam 7 downstream of the focusing means 9, and, by the relative translational movement between the mirror 19 and the retro-reflection system 21, to modify the angle of attack 107 with the substrate 11. Examples of drive systems are electric motors, brushless motors.

The retro-reflection system 21 comprised in the optical system 2 comprises, for example, a Dove prism and a right-angled isosceles prism. Another embodiment of a retro-reflection system comprises for example a Dove prism, a right-angled isosceles prism, a half-wave blade, a roof prism and a polarizing semi-reflective mirror.

FIGS. 3a, 3b and 3c show the outgoing light beam 7 from the optical system 2 in three different positions during its precession movement downstream of focusing means 9. FIGS. 3a, 3b and 3c show optical system 2 enabling to generate an outgoing light beam 7 which is upstream of the focusing means 9, spatially offset around the optical centre 106 of the focusing means 9. The focusing means 9 being for example a converging lens. Upstream the converging lens, the FIG. 3a shows an outgoing light beam 7 offset to the left of the optical centre of the converging lens, FIG. 3b shows an outgoing light beam 7 offset forward or backward of the optical centre 106 of the converging lens and FIG. 3c shows an outgoing light beam 7 offset to the right of the optical centre 106. Preferably, the forward or backward offset in relation to the optical centre 106 shown in FIG. 3b corresponds to the same distance as the left or right offset from the optical centre 106 in FIGS. 3a and 3c. Preferably, the projection described by the outgoing light beam 7 on the upstream surface of the converging lens 9 is a circle. Preferably the centre of the circle described by the outgoing light beam 7 on the upstream surface of the converging lens 9 is coincident with the optical centre of the converging lens 9.

FIGS. 3a, 3b and 3c show that the position of the outgoing light beam 7 on the converging lens enables to modify the angle of attack 107 of the outgoing light beam 7 to be modified with a normal 106 to the upper surface 16 of the substrate 11. The angle of attack 107 of the outgoing light beam 7 is controlled by the selection of the converging lens and the side offset of the outgoing light beam in relation to the optical centre of the converging lens. The rotational movement of the outgoing light beam 7 upstream of the lens enables to create a precession movement downstream of the converging lens 9 which has an angle of attack that can be selected. Depending on the selected angle of attack 107, the substrate 11 is structured or machined with a controlled conicity. The control of the angle of attack 107 enables for example to compensate for the energy distribution of the laser beam in order to obtain structuring or machining with zero conicity. The control of the angle of attack 107 enables for example to compensate for the energy distribution of the laser beam in order to obtain structuring or machining with a negative conicity.

FIGS. 3a, 3b and 3c show positions of the focused outgoing light beam 7 enabling the formation of a negative conicity structure, hole or machining. The negative conicity is for example characterized by a negative conicity angle 108 described by a normal 106 to the upper surface 16 of the substrate 11 and an edge of the structuring or machined part by the focused outgoing light beam 7. For example when structuring or machining a substrate, the position of the converging lens 9 is modified in relation to the upper surface 16 of the substrate in order to modify the position of the image focus of the lens and thus modify the point, spot or small focusing surface of the outgoing light beam 7. The structuring depth is for example defined in a non-exhaustive way by the speed of the precession, by the interval between each light pulse, by the quantity of energy of each light pulse, by the wavelength of the light beam, by the absorption coefficient of the substrate, by the physical properties of the substrate . . . .

Figure 4:
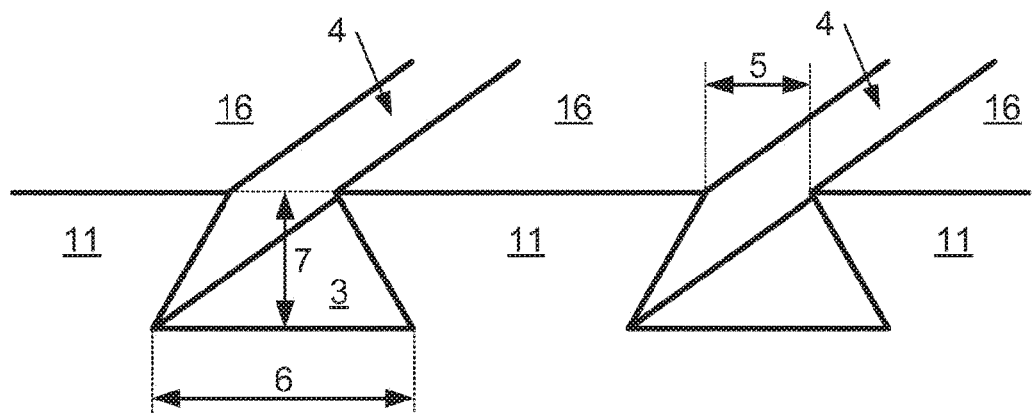
FIG. 4 illustrates an embodiment of a substrate obtained by a method according to a possible embodiment of the invention.

FIG. 4 shows a substrate structured according to an embodiment according to a second aspect of the invention. FIG. 4 shows two parallel structures or patterns 17 in the shape of grooves 17 formed according to the method according to the invention. These grooves 17 are formed according to the method and in particular by carrying out the following steps: a) providing the device 100; b) providing the substrate 11 so that it can be moved by the movement device 60 in relation to the focused outgoing light beam 7; c) generating with the light source 33 the incoming light beam 1 capable of etching the substrate 11 from its upper surface 16; d) generating from the incoming light beam 1 as it passes through the optical system 2 and then through the focusing means 9, a focused outgoing light beam 7 describing a precession movement in relation to the upper surface 16 of the substrate 11; e) moving the substrate 11 relatively in relation to the focused outgoing light beam 7 describing a precession movement by means of the movement device 60 in order to etch a pattern 17 and more particularly grooves 17 from the upper surface 16 of said substrate 11, the grooves 17 formed comprising a cavity 3 opening through an opening 4 at the upper surface 16 of the substrate 11.

Figure 5:
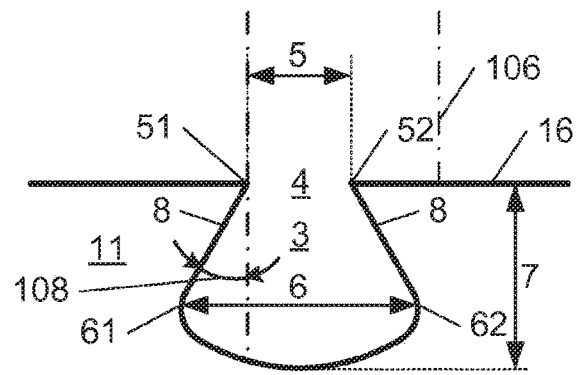
FIG. 5 illustrates an embodiment of a substrate obtained by a method of structuring according to de invention.

In FIGS. 4 and 5, each pattern or formed groove 17 comprise a cavity 3 as well as side walls 8, the cavity 3 described in a plan essentially perpendicular to the upper surface 16, comprises at its opening 4 on the upper surface 16 of the substrate 11, a first 51 and a second 52 ends defined by an intersection between the upper surface 16 and the side walls 8. It is possible to define an opening width 5 by the distance between the first 51 and second 52 ends of the opening 4. A maximum width 6 of the cavity 3 is parallel to the upper surface 16 of the substrate 11 so that the maximum width 6 of the cavity 3 defines a first 61 and a second 62 end of maximum width 6 with the side walls 8 of the cavity 3. A maximum depth 7 of the cavity 3 can also be described as the depth of groove 17 or structuring 17 in relation to the upper surface 16 of the substrate 11. In FIGS. 4 and 5, the opening width 5 of cavity 3 is strictly smaller than the maximum width 6 of the cavity 3. The cavity 3 is a cavity represented in FIG. 4 as a groove 17 or surface structure. The grooves or structures having an opening width 5 of cavity 3 smaller than the maximum width 6 or width below the surface are called negative conicity grooves or structures.

The negative conicity angle 108 described between a wall 8 of the groove 17 and a normal 106 to the upper surface 16 of substrate 11 enables to define the structuring of the surface. It is also possible to obtain a zero conicity of groove when the angle 108 is equal to or very close to zero. A positive conicity can also be obtained by the device and the method of the invention.

The width 5 of the opening 4 of the structuring is preferably comprised between 1 mm and 10 µm, more preferably comprised between 500 µm and 30 µm and even more preferably comprised between 150 µm and 50 µm. The maximum width 6 of the structuring is preferably comprised between 1.1 mm and 15 µm, more preferably comprised between 550 µm and 45 µm and even more preferably comprised between 200 µm and 60 µm.

The grooves have a depth 7 which can be in the range of 1 µm to 2 mm, more preferably 5 to 500 µm and even more preferably 10 to 200 µm. The inventors have found that this last depth interval 7 is optimal for adhering the structured substrate 11 with a second material. A depth 7 comprised between 50 µm and 150 µm is particularly preferred.

Figure 6:
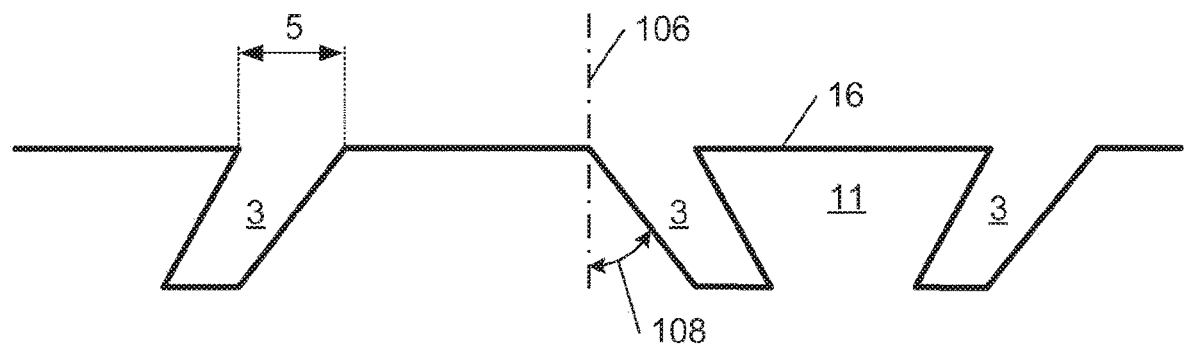
FIG. 6 illustrates an embodiment of a substrate obtained by a method of structuring according to the invention.

FIG. 6 shows an example of grooves formed for a particular embodiment of the invention. FIG. 6 shows in a plan essentially perpendicular to the upper surface 16 of the substrate 11, formed grooves and comprising a cavity 3. These formed grooves have a width which can vary but preferably have a non-zero conicity angle 108 in relation to a normal 106 to the upper surface 16 of the substrate 11. In another embodiment, these grooves have a constant width in the thickness of the substrate and have an non-zero angle of conicity 108 in relation to a normal 106 to the upper surface 16 of the substrate 11. These grooves angled in relation to a normal 106 have, in the direction of the normal 106, a part of the cavity 3 located below the upper surface 16 of the substrate and a part of the cavity located below the opening 4. Several grooves formed angled in relation to the upper surface 16 with a width 5 in the thickness can be formed as shown in FIG. 6, i. e. by having a symmetry in relation to each other in a cutting plan. For example, for a plurality of grooves, every second groove has the same orientation in a cutting plan. The formation of these angled grooves requires, for example, an optical system 2 requiring a movable mirror 19 and a redirection system that can be a simple mirror. These grooves enable for example to obtain assembly properties with a second material comparable to those obtained with the grooves shown in FIG. 4, Indeed, the grooves shown in FIG. 6 can be seen as a decomposition of the mechanical anchoring property of the grooves shown in FIG. 4. The mechanical anchoring of a second material being created by the second material present under the surface of the substrate and not only under the opening 4. Thus the angled grooves as shown in FIG. 6 enable, provided they are sufficiently close together, to obtain a mechanical anchoring effect of a second material similar to that created by the grooves in FIG. 4. The angle of the walls 8 of the angled grooves with a normal 106 is preferably not zero and more preferably comprised between 0° and 30° and even more preferably comprised between 1° and 20°. For example, the angled grooves have an opening width 5 that can vary along these grooves and have a conical profile. The formation of two cavities 3 or more at the upper surface 16 of a substrate 11 enables the creation of structures to obtain a good mechanical anchorage of a second material and to obtain a cohesive rupture in the second material during a mechanical test.

By introducing a second material into the grooves of the structured substrate, it is possible to create a waveguide. The second material is then inserted into the negative conicity structuring by the upper surface of the substrate. Preferably, the second material is a polymer that is polymerized within the negative conicity structure. The second material has a refractive index higher than the refractive index of the substrate. The second material comprises a polymeric material and or more preferably poly(methyl methacrylate). A substrate comprising a metal, glass, ceramic or polymeric material can be used, for example, in combination with the second material. Negative conicity structuring comprising a second material enables the transport of an electromagnetic wave in a controlled way, i.e. longitudinally to the structuring. The structuring is for example in a straight line or describing a curve or both. The optical coupling of the waveguide with another optical device can be done on one of the side faces of the substrate. The negative conicity structure, filled with a second material, enables the propagation of waves by multiple reflections (on the interfaces between the substrate 11 and the second material and on the surfaces between the second material and the air) in the way of an optical fibre.

An electrical circuit comprising a substrate 11 according to the third aspect of the invention is formed by inserting a conductive material into the negative conicity structure. The conductive material has for example a higher absorption coefficient than the absorption coefficient of the substrate 11 in the wavelength range 200 nm-2000 nm. The conductive material is for example tin, which then has a lower melting point than the substrate 11. The substrate is a material having a high electrical resistance. The conductive material is for example melted and cast inside the negative conicity structuring in order to fill at least partially the negative conicity structuring. Preferably the substrate 11 is electrically insulating, i. e. it enables to electrically insulate conductive elements of electricity from each other. For example, the conductive material in a viscous state is introduced by capillary action. The substrate 11 is for example a transparent material of the type Poly(ethylene terephthalate) (PET) or Poly(ethylene naphthalate) (PEN) for its insulating properties and mechanical flexibility. A flexible material is a material that can be wrapped around a cylindrical support with a minimum diameter of 1 cm. A flexible material can be used in a continuous process of deposition roll-to-roll. For example, the substrate is made of bakelite. For example, electrical connections can be made by affixing a component to be electrically connected in contact with the conductive material through the opening 4 of the negative conicity and locally heating with a heating laser the conductive material at the desired location. The heating laser is for example transmitted through the transparent substrate. The conductive material preferably comprises metal, tin or metal particles.

This invention has been described in relation to specific embodiments, which have are purely illustrative value and should not be considered restrictive. In general, this invention is not restricted to the examples illustrated and/or described above. The use of the verb "comprise", as well as its conjugations, cannot in any way exclude the presence of elements other than those mentioned. The use of the indefinite article "a", or the definite article "the" for introducing an element does not exclude the presence of a plurality of these elements. The reference numbers in the claims do not restrict their scope.

This invention may also be described as follows. Method for structuring a substrate 11 and comprising the following steps:—providing a device 100 comprising a light source 33, an optical system 2 for obtaining an outgoing light beam 7 spatially offset in relation to the incoming light beam 1, and capable of modifying this spatial offset, focusing means 9 for focusing the outgoing light beam 7, a substrate holder 59, a movement device 60 for generating movement 41 between the outgoing light beam 7 and the substrate 11;—providing and placing the substrate 11 on the substrate holder 59;— etching the substrate with the focused outgoing light beam 7 having an angle of attack 107 greater than 1° for any spatial offset between outgoing light beam 7 and incoming light beam 1 imposed by the optical system 2.

The invention claimed is:
1. A method for structuring a substrate having an upper surface and a lower surface, said method comprising the following steps:
a) providing a device comprising:
a light source for generating a structuring incoming light beam capable of machining said upper surface of said substrate, wherein pulses of the structuring incoming light beam have a duration of between $10^{-14}$ s and $10^{-8}$ s;
an optical system for obtaining, from said incoming light beam, an outgoing light beam spatially offset in relation to said incoming light beam, said optical system being capable of modifying a spatial offset between said incoming light beam and said outgoing light beam;
focusing means for focusing said outgoing light beam, wherein the outgoing light beam is spatially offset in relation to the incoming light beam while remaining parallel to a direction of the incoming light beam upstream of the focusing means;
a substrate holder;
a movement device for generating a relative movement between said outgoing light beam and said substrate holder;
b) providing and placing said substrate on said substrate holder so as to have towards said focusing means its upper surface characterized by a normal;
c) generating with the light source the incoming light beam;
d) generating from the incoming light beam as it passes through the optical system, then through the focusing means, a focused outgoing light beam describing with said normal of said upper surface of said substrate at a focusing point of said outgoing light beam an angle of attack greater than 1°, for any spatial offset between outgoing light beam and incoming light beam imposed by said optical system;
e) initiating a relative movement between said substrate holder supporting said substrate and said focused outgoing light beam for etching a pattern from the upper surface of said substrate, said formed pattern comprising a cavity in the substrate opening through an opening at the upper surface of the substrate;
defining parameters of said light source according to said relative movement initiated in step e) for generating said incoming light beam such that the cavity of the formed pattern is non-through between said upper surface and said lower surface of said substrate, wherein the cavity has a shape of a groove with a depth in a range of 10 μm to 200 μm.
2. The method of claim 1, characterized in that said optical system comprises:
a mirror:
having an essentially flat reflection surface defined by a normal for obtaining a first reflected light beam from a first incident light beam from said incoming light beam,
movable such that its normal is capable of describing a trajectory in a three-dimensional space;
said optical system being configured so that said first incident light beam and said normal of said mirror are separated by an angle of between 0° and 15° for all possible positions and orientations of said movable mirror;
drive means for moving said movable mirror;
a retro-reflection system:
positioned in relation to said mirror for obtaining from said first reflected light beam a second incident light beam to said mirror for all positions and orientations of said mirror for obtaining said outgoing light beam from a reflection of said second incident light beam on said movable mirror, and capable of providing said second incident light beam on said mirror, parallel to said first reflected light beam for all possible positions and orientations of said movable mirror.

3. The method of claim 2, characterized in that the optical system is configured so that said first incident light beam and said normal of said mirror are separated by an angle of between 0.01° and 10° for all possible positions and orientations of said movable mirror.

4. The method of claim 1, characterized in that the relative movement between said substrate and said outgoing light beam is a relative movement in a plan parallel to the upper surface, so that the focused outgoing light beam can etch a pattern from the upper surface on an essentially flat surface having an area greater than 1 cm$^2$.

5. The method of claim 1, characterized in that the spatial offset between the incoming light beam and the outgoing light beam imposed by the optical system is a fixed spatial offset with respect to the focusing means so as to etch a pattern having a cavity comprising:
at its opening on said upper surface of said substrate, a first and a second ends defined in a plan essentially perpendicular to said upper surface of the substrate,
an opening width defined by a distance between said first and second ends of said opening,
a cavity width defined essentially parallel to said opening width which is essentially decreasing from the upper surface along the thickness of the substrate.

6. The method of claim 1, characterized in that said optical system comprises:
a mirror:
having an essentially flat reflection surface defined by a normal for obtaining a first reflected light beam from a first incident light beam from said incoming light beam,
movable;
drive means for moving said movable mirror;
a redirection system:
positioned in relation to said mirror for obtaining from said first reflected light beam a second incident light beam to said mirror, for obtaining said outgoing light beam from a reflection of said second incident light beam on said movable mirror.

7. The method of claim 1, characterized in that the angle of attack is between 1° and 15°, for any spatial offset between the outgoing light beam and the incoming light beam imposed by said optical system.

8. The method of claim 1, characterized in that said optical system is capable of inducing a precession movement of said focused outgoing light beam in relation to the upper surface of said substrate.

9. A method of assembling a substrate with a piece and comprising the following steps:
structuring an upper surface of the substrate using a method according to claim 1, for generating a first part of structured upper surface of the substrate comprising a pattern;
providing the piece which have a surface having a second surface part comprising a fusible material having a melting point lower than the melting point of the first part of structured upper surface of the substrate;
placing the first part of structured upper surface of the substrate in contact with the second part of surface of the piece;
applying a pressure to maintain contact between the first part of structured upper surface of the substrate and the second part of surface of the piece;
providing a heater for creating a temperature increase in the fusible material sufficient to melt it; and
heating, by means of the heater, the fusible material so as to reach a temperature in the fusible material sufficient to melt at least a part of it in the pattern of the first part of structured upper surface of the substrate.

10. An assemblage comprising a substrate having an upper surface and a lower surface and a device for structuring said substrate, said device comprising:
a light source for generating a structuring incoming light beam capable of machining said upper surface of said substrate, wherein pulses of the structuring incoming light beam have a duration between $10^{-14}$ s and $10^{-8}$ s;
an optical system for obtaining, from said incoming light beam, an outgoing light beam spatially offset in relation to said incoming light beam, said optical system being capable of modifying the spatial offset between said incoming light beam and said outgoing light beam;
focusing means for focusing said outgoing light beam, wherein the outgoing light beam is spatially offset in relation to the incoming light beam while remaining parallel to a direction of the incoming light beam upstream of the focusing means;
a substrate holder;
a movement device for generating a relative movement between said outgoing light beam and said substrate holder;
said substrate being placed on said substrate holder so as to have towards said focusing means its upper surface characterized by a normal,
said device being configured so that said focused outgoing light beam and said normal of said upper surface of said substrate at a focusing point of said outgoing light beam are separated by an angle of attack greater than 1° for any spatial offset between the outgoing light beam and the incoming light beam imposed by said optical system, thereby etching a formed pattern from the upper surface of said substrate, said formed pattern comprising a cavity in the substrate opening through an opening at the upper surface of the substrate
parameters of said light source are defined according to said relative movement for generating said incoming light beam such that the cavity of the formed pattern is non-through between said upper surface and said lower surface of said substrate, wherein the cavity has a shape of a groove with a depth in the range of 10 μm to 200 μm.

11. The assemblage of claim 10, characterized in that said movement device is capable of generating said relative movement between said substrate and said outgoing light beam in an area greater than 1 cm$^2$, said relative movement being generated in a plan parallel to the upper surface, so that the focused outgoing light beam can etch a pattern from the upper surface.

12. The assemblage of claim 10, characterized in that the device is configured so that said focused outgoing light beam and a normal of said upper surface of said substrate at a focusing point of said outgoing light beam are separated by an angle of attack between 1° and 15°, for any spatial offset between the outgoing light beam and the incoming light beam imposed by said optical system.

13. The assemblage of claim 10, characterized in that said optical system comprises:
- a mirror:
  - having an essentially flat reflection surface defined by a normal for obtaining a first reflected light beam from a first incident light beam from said incoming light beam,
  - movable;
- drive means for moving said movable mirror;
- a redirection system:
  - positioned in relation to said mirror for obtaining from said first reflected light beam a second incident light beam to said mirror, for obtaining said outgoing light beam from a reflection of said second incident light beam on said movable mirror;

or,
- a mirror:
  - having an essentially flat reflection surface defined by a normal for obtaining a first reflected light beam from a first incident light beam from said incoming light beam,
  - movable such that its normal is capable of describing a trajectory in a three-dimensional space;
- said optical system being configured so that said first incident light beam and said normal of said mirror are separated by an angle of between 0° and 15° for all possible positions and orientations of said movable mirror drive means for moving said movable mirror;
a retro-reflection system:
- positioned in relation to said mirror for obtaining from said first reflected light beam, a second incident light beam to said mirror for all positions and orientations of said mirror for obtaining said outgoing light beam from a reflection of said second incident light beam on said movable mirror, and
- capable of providing said second incident light beam on said mirror, parallel to said first reflected light beam for all possible positions and orientations of said movable mirror.

14. The assemblage of claim 10, characterized in that the device further comprises a deflection system positioned between said optical system and said focusing means to offset the outgoing light beam.

15. A system for assembling a substrate with a piece comprising a fusible material having a melting point lower than the melting point of said substrate, said system comprising:
- an assemblage according to claim 10 for structuring an upper surface of said substrate;
- means for contacting said piece with said upper surface of said substrate;
- a means of compression;
- a heater capable of creating a sufficient temperature increase in said fusible material for melting at least a part of it.

* * * * *

UNITED STATES PATENT AND TRADEMARK OFFICE
CERTIFICATE OF CORRECTION

PATENT NO. : 11,267,072 B2
APPLICATION NO. : 16/624116
DATED : March 8, 2022
INVENTOR(S) : Martin et al.

It is certified that error appears in the above-identified patent and that said Letters Patent is hereby corrected as shown below:

In the Claims

| Column | Line | |
|---|---|---|
| 21 | 58 | change "have a" to -- has a -- |

Signed and Sealed this
Fourteenth Day of March, 2023

Katherine Kelly Vidal
*Director of the United States Patent and Trademark Office*